US012268318B2

(12) United States Patent
Pearce et al.

(10) Patent No.: US 12,268,318 B2
(45) **Date of Patent: *Apr. 8, 2025**

(54) PILLOW WITH BUCKLING COLUMNS

(71) Applicant: Purple Innovation, LLC, Lehi, UT (US)

(72) Inventors: Tony M. Pearce, Alpine, UT (US); Shawn D. Moon, Cedar Hills, UT (US); John Nathan Abel, Smithfield, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,824

(22) Filed: Nov. 14, 2023

(65) Prior Publication Data

US 2024/0081560 A1 Mar. 14, 2024

Related U.S. Application Data

(63) Continuation of application No. 17/123,007, filed on Dec. 15, 2020, now Pat. No. 11,812,880, which is a (Continued)

(51) Int. Cl.
*A47G 9/10* (2006.01)
*A47G 9/00* (2006.01)
(Continued)

(52) U.S. Cl.
CPC ............. *A47G 9/10* (2013.01); *A47G 9/1081* (2013.01); *B68G 1/00* (2013.01); *B68G 7/05* (2013.01);
(Continued)

(58) Field of Classification Search
CPC .. A47G 9/10; A47G 9/1081; A47G 2009/003; A47G 2009/008; A47G 2009/1018
See application file for complete search history.

(56) References Cited

U.S. PATENT DOCUMENTS

D120,254 S 4/1940 Carragher et al.
2,958,885 A 11/1960 Donney
(Continued)

FOREIGN PATENT DOCUMENTS

CN 1615771 A 5/2005
CN 201097890 Y 8/2008
(Continued)

OTHER PUBLICATIONS

Canadian Intellectual Property Office, "Examiner's Requisition," Canadian Application No. 3037403, Apr. 29, 2020.
(Continued)

*Primary Examiner* — Eric J Kurilla
(74) *Attorney, Agent, or Firm* — Foley & Lardner LLP

(57) ABSTRACT

A pillow includes a first pillow cushion consisting essentially of a gelatinous elastomer that is sized and configured to support a head and neck of a person using the pillow cushion and a second pillow cushion coupled thereto. The pillow cushion has deformable wall members located and configured to define voids therebetween such that the deformable wall members may be displaced into adjacent voids upon deformation of the deformable wall members. The deformable wall members are configured to buckle when a pressure applied to a cushioning surface of the first pillow cushion, in a direction perpendicular to a first major surface, exceeds a threshold pressure level. A pillow cover covers the first pillow cushion and the second pillow cushion. A method of fabricating a pillow includes enclosing such first and second pillow cushions in a pillow cover.

20 Claims, 7 Drawing Sheets

Related U.S. Application Data continuation of application No. 15/936,175, filed on Mar. 26, 2018, now Pat. No. 10,863,837, which is a continuation-in-part of application No. 15/333,486, filed on Oct. 25, 2016, now Pat. No. 10,772,445.

(60) Provisional application No. 62/397,818, filed on Sep. 21, 2016.

(51) Int. Cl.
*B68G 1/00* (2006.01)
*B68G 7/05* (2006.01)
*B68G 7/06* (2006.01)
*B68G 11/04* (2006.01)

(52) U.S. Cl.
CPC ................ *B68G 7/06* (2013.01); *B68G 11/04* (2013.01); *A47G 2009/003* (2013.01); *A47G 2009/008* (2013.01); *A47G 2009/1018* (2013.01); *B68G 2001/005* (2013.01)

(56) References Cited

U.S. PATENT DOCUMENTS 4,369,284 A 1/1983 Chen
4,603,445 A * 8/1986 Spann .................. A47C 27/146 5/736
D308,453 S 6/1990 Elrod
D322,533 S 12/1991 Hudson
5,134,735 A 8/1992 Rose
5,243,722 A 9/1993 Gusakov
D352,858 S 11/1994 Farley
D355,322 S 2/1995 Ackley et al.
D372,158 S 7/1996 Bonaddio et al.
D375,863 S 11/1996 Bigolin
5,661,556 A 8/1997 Schiff et al.
5,749,111 A * 5/1998 Pearce .................... B29C 48/11 428/137
D395,780 S 7/1998 Denney et al.
D414,976 S 10/1999 Su et al.
5,992,106 A 11/1999 Carling et al.
5,994,450 A 11/1999 Pearce
6,026,527 A 2/2000 Pearce
6,108,835 A 8/2000 Hwang
D453,880 S 2/2002 Cheynet
6,413,458 B1 7/2002 Pearce
6,498,198 B2 12/2002 Pearce
6,551,053 B1 4/2003 Schuetz
D517,848 S 3/2006 Contreras
7,060,213 B2 6/2006 Pearce
D527,564 S 9/2006 Contreras
7,964,664 B2 6/2011 Pearce
8,424,137 B1 4/2013 Pearce et al.
D692,674 S 11/2013 Clerici et al.
8,784,982 B2 7/2014 Pearce et al.
D710,116 S 8/2014 Blackford
8,793,821 B2 8/2014 Fowkes et al.
8,919,750 B2 12/2014 Pearce et al.
8,932,692 B2 1/2015 Pearce
9,038,221 B2 5/2015 Fraser
D731,820 S 6/2015 Lechantre et al.
9,051,169 B2 6/2015 Pearce et al.
9,265,354 B2 2/2016 Mason
D758,101 S 6/2016 Mason
D758,102 S 6/2016 Mason
D760,502 S 7/2016 Oh et al.
D775,864 S 1/2017 Bertocello et al.
D790,254 S 6/2017 Brown
D792,127 S 7/2017 Roberts et al.
9,737,152 B2 8/2017 Mason
D799,858 S 10/2017 Pearce et al.
D804,856 S 12/2017 Desodt et al.
D804,859 S 12/2017 Desodt et al.
D805,327 S 12/2017 Desodt et al.
D811,776 S 3/2018 Desodt et al.
9,907,343 B2 3/2018 Lacey et al.
D833,778 S 11/2018 Desodt et al.
D840,717 S 2/2019 Lu
D840,724 S 2/2019 Dowd
10,206,512 B2 2/2019 Kim et al.
D845,677 S 4/2019 Desodt et al.
D846,310 S 4/2019 Klobuchar
D864,613 S 10/2019 Pearce et al.
D896,547 S 9/2020 Huang
10,772,445 B2 * 9/2020 Pearce ..................... A47G 9/10
10,863,837 B2 12/2020 Pearce et al.
D909,092 S 2/2021 Pearce et al.
D909,790 S 2/2021 Pearce et al.
D917,926 S 5/2021 Pearce et al.
D917,927 S 5/2021 Taylor et al.
D923,970 S 7/2021 He
D935,224 S 11/2021 Wang et al.
D935,225 S 11/2021 Wang et al.
D935,226 S 11/2021 Wang et al.
D950,981 S 5/2022 Luo
D962,680 S 9/2022 Huang
D986,636 S 5/2023 Li et al.
D990,930 S 7/2023 Taylor et al.
D991,706 S 7/2023 Taylor et al.
11,812,880 B2 * 11/2023 Pearce ................... B68G 11/04
D1,014,135 S 2/2024 Woodard et al.
2001/0042271 A1 11/2001 Pearce
2002/0078507 A1 6/2002 Pearce
2002/0189016 A1 12/2002 Habboub et al.
2003/0096899 A1 * 5/2003 Pearce ................. C08K 5/0016 524/474
2004/0187210 A1 * 9/2004 Hickman ............. A47G 9/0253 5/482
2005/0017396 A1 1/2005 Pearce et al.
2005/0060806 A1 3/2005 Wilkinson
2005/0172410 A1 * 8/2005 Huang ................. A47G 9/0246 5/636
2007/0061978 A1 3/2007 Losio
2008/0244832 A1 10/2008 Kuo
2008/0271250 A1 11/2008 Poppe
2010/0227091 A1 * 9/2010 Pearce ...................... B32B 3/08 428/36.1
2011/0061167 A1 3/2011 Farley
2012/0017374 A1 1/2012 Hunter et al.
2012/0131752 A1 5/2012 Mason
2012/0276339 A1 11/2012 Pearce et al.
2013/0043628 A1 * 2/2013 Pearce ..................... A47C 7/02 267/153
2013/0139321 A1 6/2013 McCausland et al.
2013/0167302 A1 7/2013 Pearce
2014/0259426 A1 9/2014 Pearce
2015/0000042 A1 1/2015 Randall
2016/0157629 A1 6/2016 Poppe
2016/0166092 A1 6/2016 Alletto, Jr.
2017/0020312 A1 * 1/2017 Davis ....................... A47G 9/10
2017/0128307 A1 5/2017 Kim
2017/0254379 A1 9/2017 Whatcott
2018/0078062 A1 3/2018 Pearce et al.
2018/0140116 A1 5/2018 Werner
2018/0305199 A1 10/2018 Pearce et al.

FOREIGN PATENT DOCUMENTS

CN 201384307 Y 1/2010
CN 201782434 U 4/2011
CN 301837053 S 4/2011
CN 202820602 U 3/2013
CN 104433501 A 3/2015
CN 307788387 A 1/2023
CN 308002495 4/2023
EP 2649909 A1 10/2013
JP 2001104129 A 4/2001
JP 2001514912 A 9/2001
JP 2002360402 A 12/2002
JP 2003061802 A 3/2003
JP 2005143552 A 6/2005
JP 2005152480 A 6/2005
JP 3140168 U 3/2008

(56) References Cited

FOREIGN PATENT DOCUMENTS

| | | | |
|---|---|---|---|
| JP | 2014533550 | A | 12/2014 |
| JP | 5766373 | B1 | 8/2015 |
| JP | 2015139509 | A | 8/2015 |
| KR | 200315096 | Y1 | 6/2003 |
| KR | 1020050045819 | A | 5/2005 |
| KR | 100671937 | B1 | 1/2007 |
| KR | 2020120008378 | A | 12/2012 |
| KR | 200468668 | Y | 9/2013 |
| KR | 1020150009457 | A | 1/2015 |
| KR | 101553373 | B1 | 9/2015 |
| KR | 1020160032065 | A | 3/2016 |
| KR | 1020160036199 | A | 4/2016 |
| KR | 102079421 | B1 | 4/2020 |
| TW | M470585 | U | 1/2014 |
| TW | M498549 | U | 4/2015 |
| WO | 1998007358 | A1 | 2/1998 |
| WO | 2016088977 | A1 | 6/2016 |
| WO | 2016111434 | A1 | 7/2016 |

OTHER PUBLICATIONS

China National Intellectual Property Administration, "Fourth Office Action," Chinese Application No. 201780005390.3, Jun. 1, 2021.

China National Intellectual Property Administration, "Notice of Reexamination," Chinese Application No. 201780005390.3, Jan. 24, 2024.

China National Intellectual Property Administration, "Decision of Reexamination," Chinese Application No. 201780005390.3, dated Mar. 18, 2024.

Chinese National Intellectual Property Administration, "Office Action," Canadian Application No. 201780005390.3, Jun. 1, 2020.

China National Intellectual Property Administration, "Office Action," Chinese Application No. 201780005390.3, Sep. 23, 2021.

China National Intellectual Property Administration, "First Office Action", Chinese Application No. 201780005390.3, Sep. 29, 2019.

Chinese National Intellectual Property Administration, "Third Office Action," Canadian Application No. 201780005390.3, Jan. 6, 2021.

European Patent Office, "Communication Under Rule 71(3) EPC," European Application No. 17853779.1, Feb. 9, 2024.

European Patent Office, "Extended European Search Report," European Application No. 17853779.1, Apr. 22, 2022.

European Patent Office, "Communication Pursuant to Article 94(3) EPC," European Application No. 17853779.1, Sep. 19, 2023.

European Patent Office, "Extended European Search Report," European Application No. 17853779.1, Apr. 28, 2020.

IP Australia, "Examination Report No. 2," Australian Application No. 2017332148, Nov. 23, 2023.

Japan Patent Office, "Notice of Allowance," Japanese Application No. 2019-167768, Jan. 4, 2023.

Japan Patent Office, "Office Action," Japanese Application No. 2019-167768, Jul. 6, 2021.

Japan Patent Office, "Final Office Action," Japanese Application No. 2019-167768, Apr. 28, 2022.

Japan Patent Office, "Reasons for Rejection," Japanese Application No. 2019-514114, Jul. 30, 2019.

Korean Intellectual Property Office, "Notice of Final Rejection," Korean Application No. 1-2019-7009876, Jun. 23, 2022.

Korean Intellectual Property Office, "Notice of Preliminary Rejection," Korean Application No. 10-2022-7036758, Nov. 28, 2022.

Korean Intellectual Property Office, "Notice of Allowance," Korean Application No. 10-2022-7036758, May 31, 2023.

Korean Intellectual Property Office, "Notice of Allowance," Korean Application No. 10-2022-7036762, Jul. 2, 2023.

Korean Intellectual Property Office, "Notice of Final Rejection," Korean Application No. 10-2019-7009876, Feb. 9, 2022.

Korean Intellectual Property Office, "Notice of Final Rejection," Korean Application No. 10-2019-7009876, Nov. 11, 2021.

Korean Intellectual Property Office, "Notice of Preliminary Rejection," Korean Application No. 10-2022-7036762, Nov. 28, 2022.

Korean Intellectual Property Office, "Notice of Preliminary Rejection," Korean Application No. 10-2019-7009876, Jun. 15, 2021.

Purple Pillow, Kickstarter Project Page. Date Launched: Sep. 22, 2016, Date Captured: Apr. 5, 2024. Available on the Internet URL: https://www.kickstarter.com/projects/227992716/purple-pillow-the-worlds-first-no-pressure-head-be/posts (Year: 2016).

Purple Pillow, Amazon Product Page. Date First Available: May 5, 2020, Date Captured: Apr. 5, 2024. Available on the Internet URL: https://www.amazon.com/dp/B0884ZVCG7 (Year: 2020).

The Purple Pillow, YouTube Video. Date Posted: Sep. 30, 2016, Date Captured: Apr. 5, 2024. Available on the Internet URL: https://www.youtube.com/watch?v=xX2FcnxrHyA (Year: 2016).

Taiwan Intellectual Property Office, " Office Action and Search Report," Taiwan Application No. 106132218, May 7, 2018.

USPTO as International Searching Authority, "International Search Report and Writtren Opinion," International Application No. PCT/US2017/052421, Jan. 18, 2018.

United States International Trade Commission Washington, D.C., "Respondents' Joint Disclosure of Initial Invalidity Contentions," Investigation No. 337-TA-1328, Dec. 2, 2022.

* cited by examiner

PILLOW WITH BUCKLING COLUMNS

CROSS-REFERENCE TO RELATED APPLICATIONS

This application is a continuation of U.S. patent application Ser. No. 17/123,007, filed on Dec. 15, 2020 and titled PILLOW INCLUDING GELATINOUS ELASTOMER CUSHIONING MATERIALS ("the '007 Application"), now U.S. Pat. No. 11,812,880, issued Nov. 14, 2023, which is a continuation of U.S. patent application Ser. No. 15/936,175, filed on Mar. 26, 2018 and titled PILLOW INCLUDING GELATINOUS ELASTOMER CUSHIONING MATERIALS ("the '175 Application"), now U.S. Pat. No. 10,863,837, issued Dec. 15, 2020, which is a continuation-in-part of U.S. patent application Ser. No. 15/333,486, filed on Oct. 25, 2016 and titled PILLOW INCLUDING GELATINOUS ELASTOMER CUSHIONING MATERIALS ("the '486 Application"), now U.S. Pat. No. 10,772,445, issued Sep. 15, 2020, in which a claim for the benefit of priority to the Sep. 21, 2016 filing date of U.S. Provisional Patent Application No. 62/397,818, titled PILLOW INCLUDING GELATINOUS ELASTOMER CUSHIONING MATERIALS ("the '818 Provisional Application") was made pursuant to 35 U.S.C. § 119(e). The entire disclosures of the '007 Application, the '175 Application, the '486 Application, and the '818 Provisional Application are hereby incorporated herein.

TECHNICAL FIELD

Embodiments of the disclosure relate generally to pillows, and to methods of making pillows. More particularly, embodiments of the present disclosure relate to pillows that include a gelatinous elastomer cushion having deformable wall members, and to methods of making and using such pillows.

BACKGROUND

Pillows are used to support the head and neck while sleeping or lying down. Pillows typically consist of a fabric envelope, referred to as a "pillowcase," which contains a soft cushioning material. The soft cushioning material typically comprises synthetic or natural fiber material, down feathers, or a synthetic foam material.

The inventor of the present invention has also previously invented various cushioning materials and cushions that include gelatinous elastomer materials. For example, the following patents disclose various gelatinous elastomer cushions: U.S. Pat. No. 5,749,111 issued May 12, 1998 to Pearce, U.S. Pat. No. 6,026,527 issued Feb. 22, 2000 to Pearce, U.S. Pat. No. 6,413,458 issued Jul. 2, 2002 to Pearce, and U.S. Pat. No. 8,919,750 issued Dec. 30, 2014 to Pearce et al., the disclosures of which are hereby incorporated herein in their entireties by this reference.

SUMMARY

In some embodiments, a pillow comprises a first pillow cushion defining a first major surface of the pillow, a second pillow cushion coupled thereto at an interface, and a pillow cover enclosing the first and second pillow cushions. The first pillow cushion consists essentially of a gelatinous elastomer and defines a first major surface of the pillow. The first pillow cushion is sized and configured to support a head and neck of a person using the pillow. The first pillow cushion comprises deformable wall members extending between the first major surface and the interface. The deformable wall members are located and configured to define voids therebetween such that the deformable wall members may be displaced into adjacent voids upon deformation of the deformable wall members. The deformable wall members configured to buckle when a pressure applied to the first major surface of the first pillow cushion, in a direction perpendicular to the first major surface, exceeds a threshold pressure level. The second pillow cushion defines a second major surface of the pillow opposite the first major surface. The second pillow cushion has a material composition different from the first pillow cushion.

In other embodiments, a method of fabricating a pillow comprises forming a first pillow cushion consisting essentially of a gelatinous elastomer. The first pillow cushion is sized and configured to support a head and neck of a person using the first pillow cushion. The first pillow cushion comprises deformable wall members located and configured to define voids therebetween such that the deformable wall members may be displaced into adjacent voids upon deformation of the deformable wall members. Ends of the deformable wall members define a first major surface of the pillow. The deformable wall members are configured to buckle when a pressure applied to the first major surface of the pillow first cushion, in a direction perpendicular to the first major surface, exceeds a threshold pressure level. The method further comprises coupling the first pillow cushion to a second pillow cushion. The second pillow cushion defines a second major surface of the pillow opposite the first major surface of the pillow. The second pillow cushion has a material composition different from the first pillow cushion. A pillow cover encloses the first pillow cushion and the second pillow cushion.

BRIEF DESCRIPTION OF THE DRAWINGS

While the specification concludes with claims particularly pointing out and distinctly claiming what are regarded as embodiments of the present invention, various features and advantages of embodiments of the disclosure may be more readily ascertained from the following description of example embodiments when read in conjunction with the accompanying drawings, in which:

DETAILED DESCRIPTION

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

The illustrations presented herein are not actual views of any particular pillow, pillow cushion, pillow insert, or pillow cover, but are merely idealized representations employed to describe embodiments of the present disclosure. Elements common between figures may retain the same numerical designation.

Figure 1:
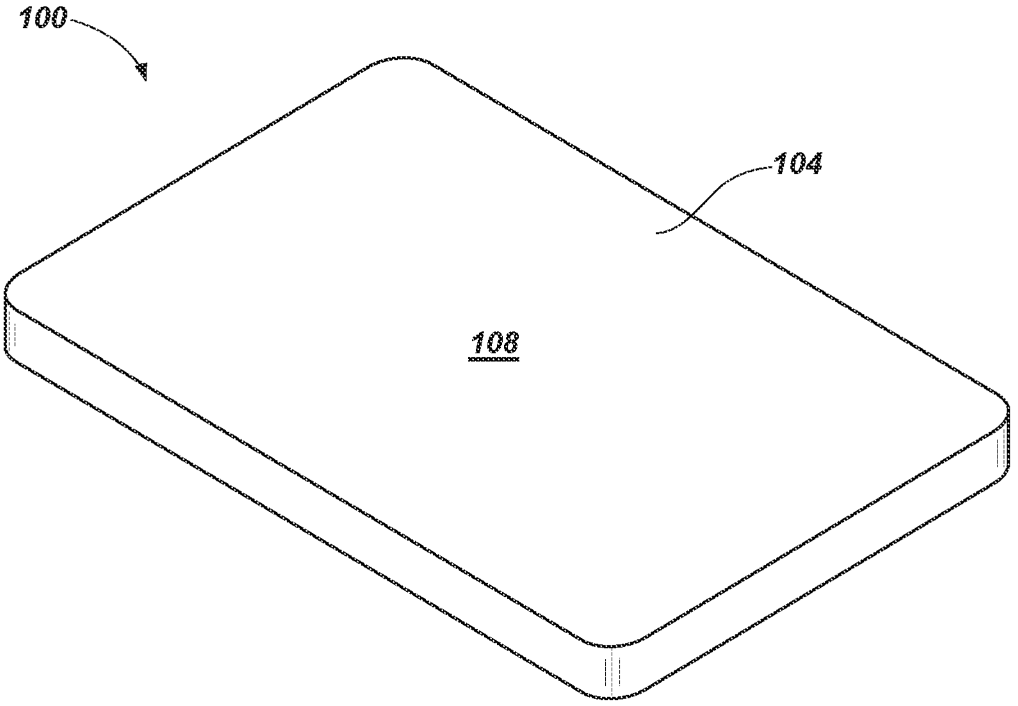
FIG. 1 is a top perspective view of an embodiment of a pillow of the present disclosure.
Figure 2:
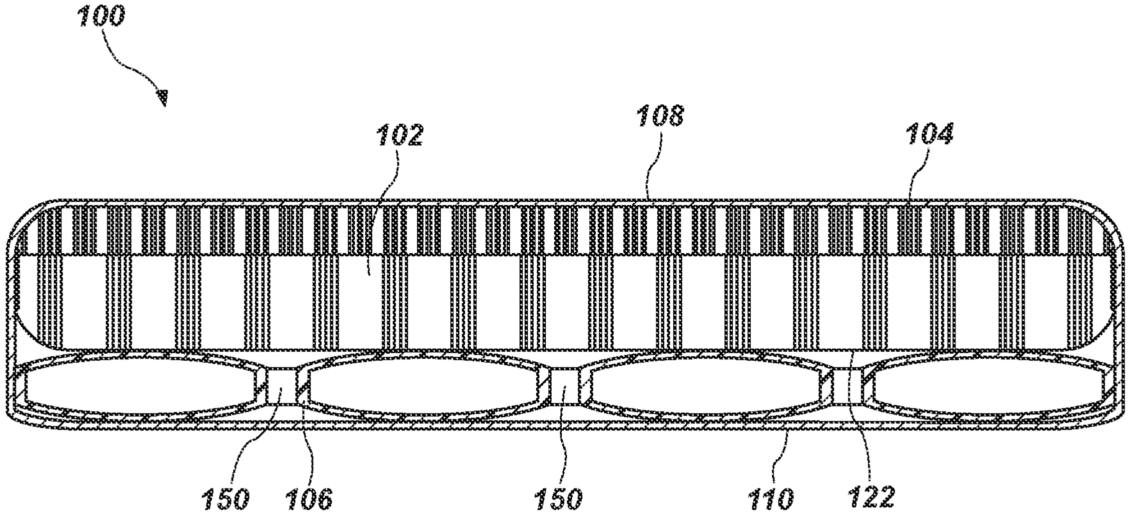
FIG. 2 is a cross-sectional side view of the pillow of FIG. 1.

FIG. 1 illustrates an embodiment of a pillow 100 of the present disclosure in perspective view. FIG. 2 is a cross-sectional view of the pillow 100. As shown in FIG. 2, the pillow 100 includes a pillow cushion 102 and a pillow cover 104 covering the pillow cushion 102. The pillow 100 optionally may further include an insert 106, as discussed in further detail subsequently herein. In other words, the insert 106 may be excluded in some embodiments, such that pillow 100 consists of the pillow cushion 102 and the pillow cover 104. The pillow 100 and pillow cushion 102 are sized and configured to support a head and neck of a person using the pillow 100.

The pillow cushion 102 consists essentially of a gelatinous elastomer (also referred to in the art as "elastomer gels," "gelatinous elastomers," or simply "gels"). In some embodiments, the pillow cushion 102 may comprise 90% by weight or more, 95% by weight or more, 98% by weight or more, or even 100% by weight gelatinous elastomer. Gelatinous elastomers are elastomeric materials, which may include elastomeric polymers or mixtures of elastomeric polymers and plasticizers (and optionally other materials such as pigments, fillers, antioxidants, etc.). Gelatinous elastomers are elastic (i.e., capable of recovering size and shape after deformation).

For example, the gelatinous elastomer of the pillow cushion 102 may comprise a mixture of an elastomeric block copolymer and a plasticizer. As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B). As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As non-limiting examples, the pillow cushion 102 may comprise a gelatinous elastomer as described in U.S. Pat. No. 5,994,450, issued Nov. 30, 1999, and titled "Gelatinous Elastomer and Methods of Making and Using the Same and Articles Made Therefrom"; U.S. Pat. No. 7,964,664, issued Jun. 21, 2011, and titled "Gel with Wide Distribution of MW in Mid-Block"; and U.S. Pat. No. 4,369,284, issued Jan. 18, 1983, and titled "Thermoplastic Elastomer Gelatinous Compositions"; the disclosures of each of which are incorporated herein in their entirety by this reference.

The elastomeric block polymer of the gelatinous elastomer may be an A-B-A triblock copolymer such as styrene ethylene propylene styrene (SEPS), styrene ethylene butylene styrene (SEBS), or styrene ethylene propylene styrene (SEEPS). For example, A-B-A triblock copolymers commercially available from Kuraray America, Inc., of Houston, TX, under the trade name SEPTON® 4055, and from Kraton Polymers, LLC, of Houston, TX, under the trade names KRATON® E1830, KRATON® G1650, and KRATON® G1651 may be employed in the gelatinous elastomer. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The gelatinous elastomer may include elastomeric polymers other than styrene-based copolymers, such as non-styrenic elastomeric polymers that are thermoplastic in nature or that can be solvated by plasticizers or that are multi-component thermoset elastomers. Other elastomeric polymers that may be employed include polymers that are derivatives of these families of synthetic rubber polymers, or that exhibit similar physical properties to such synthetic rubber polymers.

The gelatinous elastomer may include one or more plasticizers, such as hydrocarbon fluids. For example, elastomeric materials may include aromatic-free food-grade white paraffinic mineral oils, such as those sold by Sonneborn, Inc., of Mahwah, NJ, under the trade names BLANDOL® and CARNATION®.

As one particular non-limiting example, the gelatinous elastomer of the pillow cushion 102 may include a melt-blend of one part by weight of a styrene-ethylene-ethylene-propylene-styrene (SEEPS) elastomeric triblock copolymer (e.g., SEPTON® 4055) with four parts by weight of a 70-weight straight-cut white paraffinic mineral oil (e.g., CARNATION® white mineral oil) and, optionally, pigments, antioxidants, and/or other additives.

The gelatinous elastomer may include one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer.

The gelatinous elastomer may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., of Iselin, NJ or as EVERNOX®-10, from Everspring Chemical, of Taichung, Taiwan; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Chemical. One or more antioxidants may be combined in a single formulation of the gelatinous elastomer. The use of antioxidants in mixtures of plasticizers and polymers is described in columns 25 and 26 of U.S. Pat. No. 5,994,450, previously incorporated by reference. The gelatinous elastomer may include up to about 5% by weight antioxidants. For instance, the gelatinous elastomer may include from about 0.10% by weight to about 1.0% by weight antioxidants.

In some embodiments, the gelatinous elastomer may include a pigment or a combination of pigments so as to provide the pillow cushion 102 with an appearance that is appealing to consumers. As one non-limiting example, the pigment may create a soothing color, which may be purple or lavender.

The gelatinous elastomer of the pillow cushion 102 is elastic in that it returns to its original shape after deformation, and may be elastically stretched and compressed. The gelatinous elastomer may be rubbery in feel, but may deform to the shape of an object applying a deforming pressure better than conventional rubber materials, and may have a durometer hardness lower than conventional rubber materials. For example, the gelatinous elastomer may have a hardness on the Shore A scale of from about 0.1 to about 50, and in some embodiments, less than about 5. The gelatinous elastomer is soft enough to not cause pain or discomfort to the ear or other facial parts of a person sleeping or resting their head on the pillow 100.

The gelatinous elastomer may be generally nonsticky, such that the pillow cushion 102 may return to its original shape after deformation. In some embodiments, the pillow cushion 102 may comprise between about six pounds and twelve pounds of the gelatinous elastomer. As one non-limiting example, the cushion may have a length of about twenty-four inches, a width of about sixteen inches, and a height or thickness of about three and one-half inches.

As shown in FIG. 2, the pillow 100 may not include any additional cushioning material between the pillow cushion 102 and the pillow cover 104. The pillow cover 104 includes an upper first major side 108 and an opposing lower second major side 110.

Figure 3:
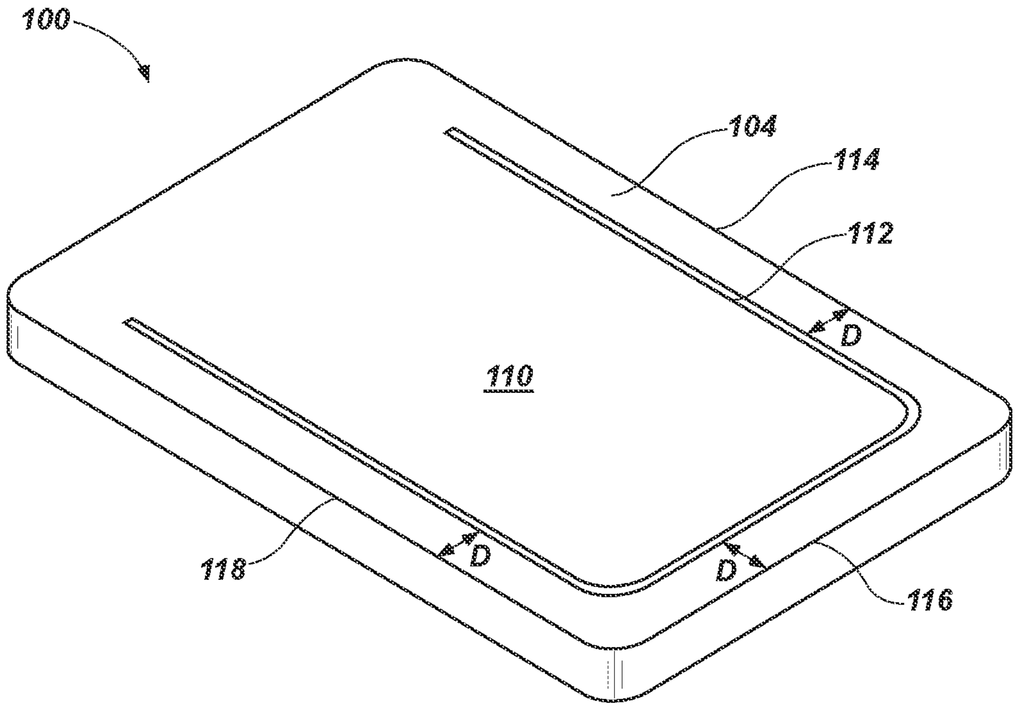
FIG. 3 is a bottom perspective view of the pillow of FIG. 1.

FIG. 3 is a perspective view of the pillow 100 illustrating the lower second major side 110 of the pillow cover 104. As shown therein, the pillow case 104 may include a zipper 112 disposed on the lower second major side 110 of the pillow cover 104. The zipper 112 may be entirely located a distance D of at least one inch from peripheral edges of the lower second major side 110 of the pillow cover 104. For example, the distance D may be between about one inch and about three inches.

As shown in FIG. 3, the zipper 112 of the pillow cover 104 may extend proximate and along at least a portion of a first longitudinal peripheral edge 114 of the pillow cover 104, proximate and along a first lateral peripheral edge 116 of the pillow cover 104, and proximate and along at least a portion of a second longitudinal peripheral edge 118 of the pillow cover 104. By extending the zipper 112 around multiple sides of the pillow cover 104, the pillow cushion 102 and optional insert 106 may be easily inserted into and removed from the pillow cover 104. Furthermore, by locating the zipper 112 a distance D from the peripheral edges of the lower second major side 110 of the pillow cover 104, the zipper 112 is less likely to be disposed adjacent the body of a person using the pillow 100, or otherwise felt by the user.

The zipper 112 may extend proximate and along three sides of the pillow cover 104 as shown in FIG. 3, or, in other embodiments, proximate and along four sides of the pillow cover 104, or proximate and along an entirety of one side and proximate and along only portions of two adjacent sides. In yet further embodiments, the zipper 112 may extend proximate and along an entirety of one side and proximate and along only a portion of one adjacent side. Any other location and configuration of the zipper 112 that facilitates insertion and removal of the pillow cushion 102 and optional insert 106 may also be employed. A fabric (e.g., a non-slip fabric) may be provided on the interior of the zipper 112.

In other embodiments, any other type of fastener, such as hook-and-loop material, may be used instead of a zipper 112 to securely close an aperture in the lower second major side 110 of the pillow cover 104.

In use, the pillow 100 with the pillow cover 104 thereon optionally may be inserted into a conventional linen pillowcase.

Figure 4:
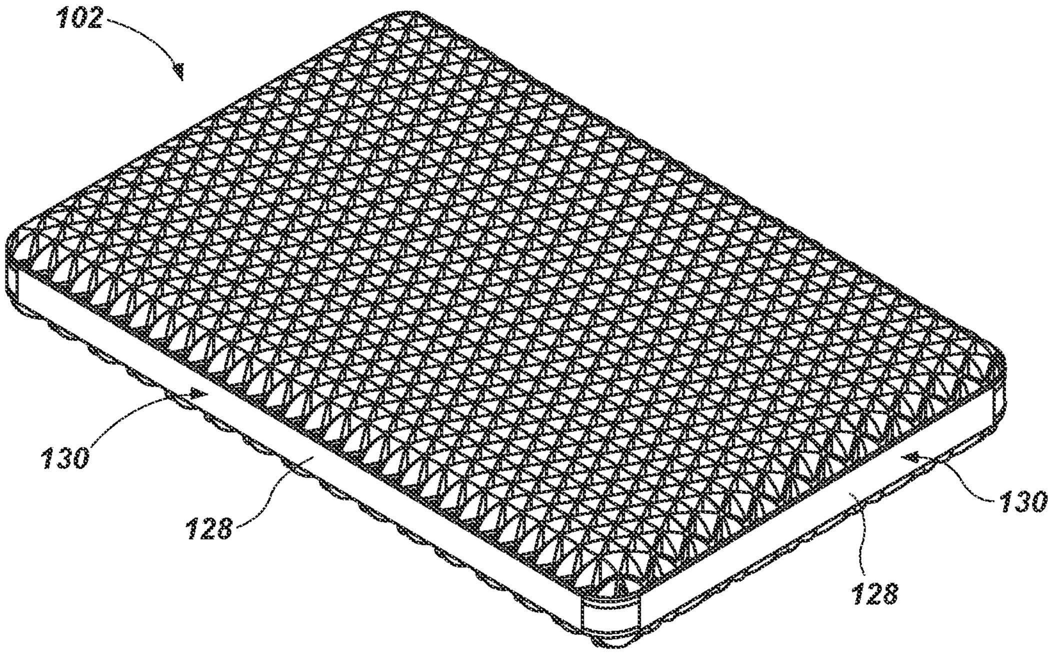
FIG. 4 is a perspective view of an embodiment of a pillow cushion of the pillow of FIG. 1.
Figure 5:
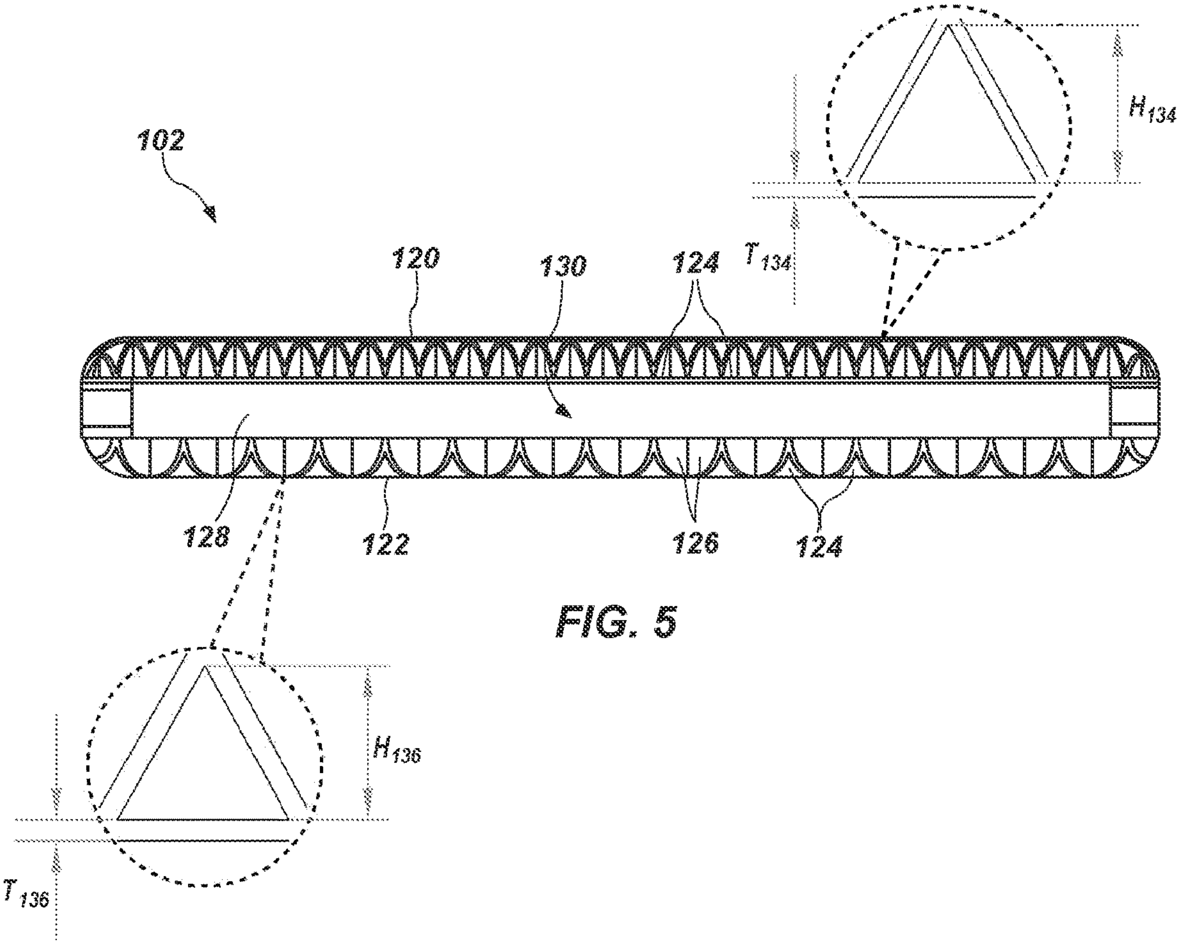
FIG. 5 is a front side view of the pillow cushion of FIG. 4.
Figure 6:
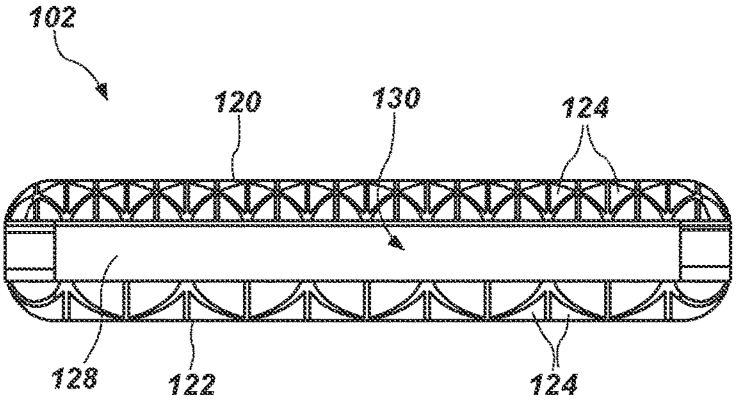
FIG. 6 is a lateral side view of the pillow cushion of FIG. 4.

The pillow cushion 102 is illustrated in FIGS. 4 through 9. FIG. 4 is a perspective view of the pillow cushion 102. As shown in FIG. 4, the pillow cushion 102 has radiused peripheral edges on the upper and lower sides of the pillow cushion 102. The radius of the peripheral edges may be from about 0.25 inch to about 5.0 inches. As shown in FIGS. 5 and 6, the pillow cushion 102 has a first major surface 120 and an opposing second major surface 122, and includes deformable wall members 124 extending between the first major surface 120 and the second major surface 122. The first major surface 120 and the second major surface 122 are defined by ends of the deformable wall members 124 collectively.

The deformable wall members 124 are located and configured to define voids 126 therebetween such that the deformable wall members 124 may be displaced into adjacent voids 126 upon deformation of the deformable wall members 124. Furthermore, the deformable wall members 124 are configured to buckle when a pressure applied to a cushioning surface of the pillow cushion 102 (i.e., the first major surface 120), in a direction perpendicular to the first major surface 120, exceeds a threshold pressure level.

Figure 7:
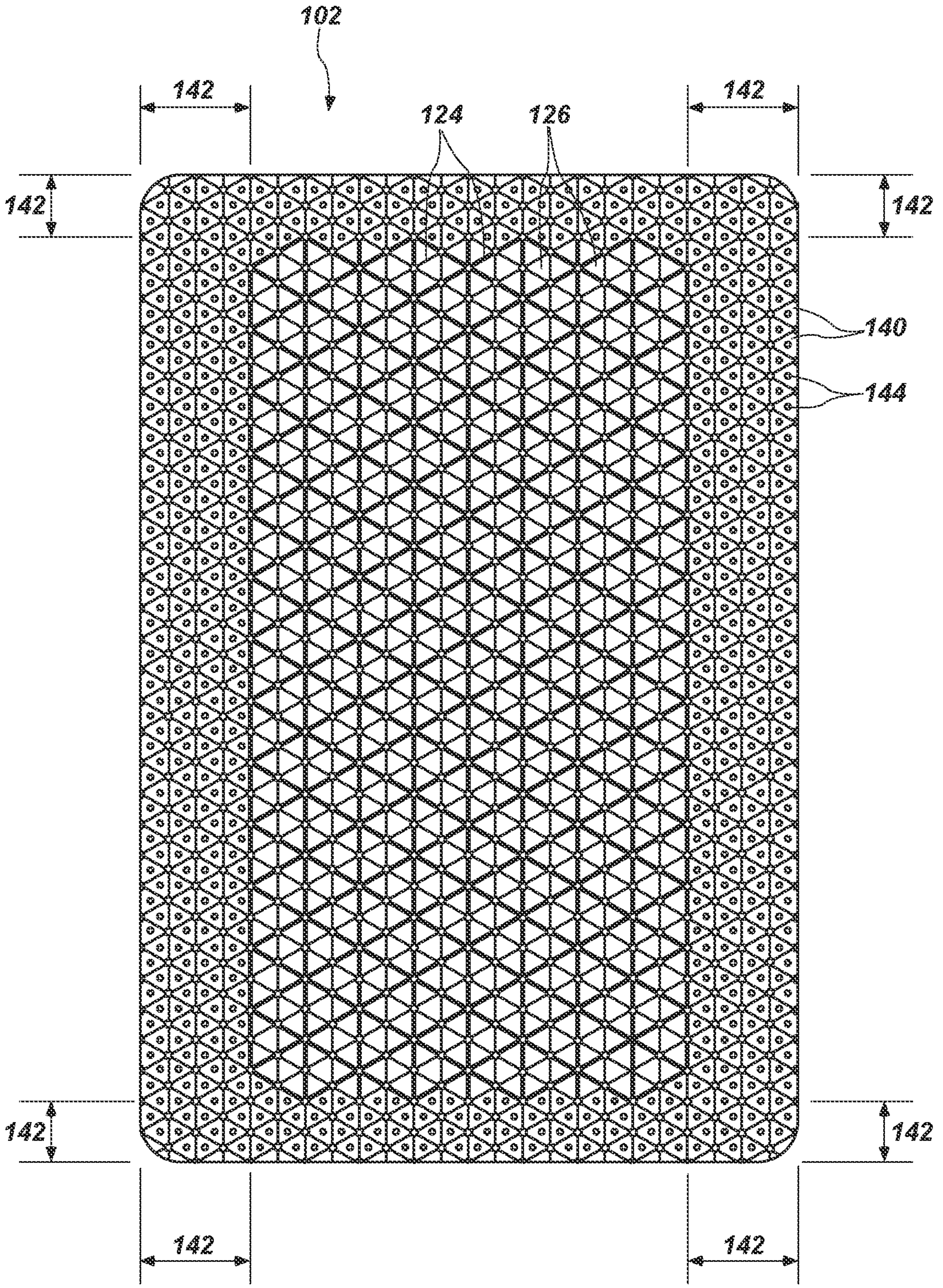
FIG. 7 is a top plan view of the pillow cushion of FIG. 4.
Figure 8:
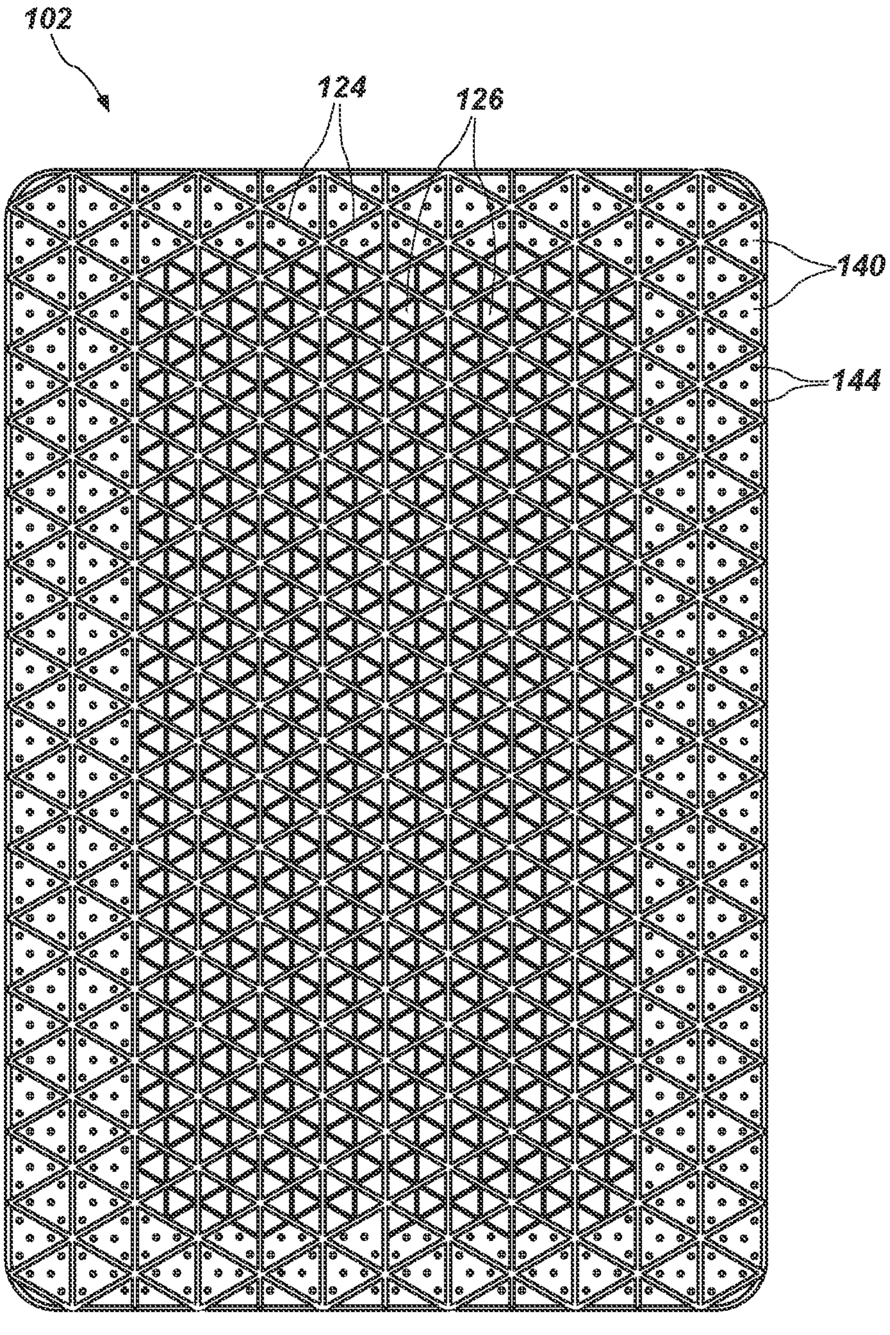
FIG. 8 is a bottom plan view of the pillow cushion of FIG. 4.

As shown in the plan views of FIGS. 7 and 8, in some embodiments, the deformable wall members 124 may be located and configured to define triangular voids 126 therebetween. In other words, the voids 126 may have a cross-sectional shape in a cross-sectional plane parallel to the first major surface 120 and the second major surface 122 (FIGS. 5 and 6). The triangular shape of the columnar voids 126 provides the pillow cushion 102 with improved stability in the lateral direction. In other embodiments, however, the voids 126 may have any other desired shape (e.g., rectangular, pentagonal, hexagonal, etc.).

In the configuration described herein, the gelatinous elastomer of the pillow cushion 102 is formed into the deformable wall members 124, which define hollow columns with shared walls that behave like a spring under pressure unless the localized pressure exceeds a threshold pressure, at which time one or more of the hollow columns buckles and the load is spread out to a larger area encompassing surrounding columns. This mechanism provides enhanced comfort, while not being so soft as to not be supportive to the neck and head so as to preserve desired spinal alignment, and not being so soft as to allow the nose of person sleeping or resting on their side to be smothered by sinking too far into the pillow 100.

Referring again to FIGS. 4 through 6, the pillow cushion 102 may further include a band 128 of the gelatinous elastomer that extends at least partially around the periphery of the pillow cushion 102 at lateral side surfaces 130 of the pillow cushion 102. The band 128 may be integrally formed with the pillow cushion 102. In some embodiments, the band 128 may define an entirety of the lateral side surfaces 130 of the pillow cushion 102 between the radiused peripheral edges on the top and bottom major sides of the pillow cushion 102, as shown in FIGS. 5 and 6. The band 128 of the gelatinous elastomer may also improve the lateral stability of the pillow cushion 102, at least in peripheral regions of the pillow cushion 102. The band 128 may comprise or define the outer wall of each of the triangular column voids 126 disposed at the outer periphery of the pillow cushion 102, as shown in FIGS. 7 and 8.

Figure 9:
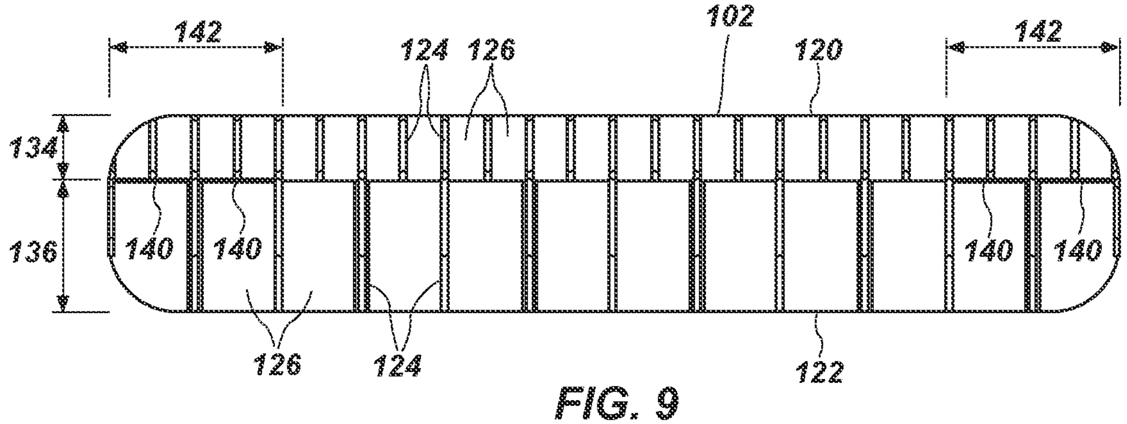
FIG. 9 is a cross-sectional side view of the pillow cushion of FIG. 4.

FIG. 9 is a cross-sectional side view of the pillow cushion 102. As shown therein, in some embodiments, the pillow cushion 102 may comprise a generally planar first portion 134, and a generally planar second portion 136 coupled with the first portion 134. Each of the first portion 134 and the second portion 136 has a top first major side and an opposite, bottom second major side. Each of the first portion 134 and the second portion 136 further includes a portion of the deformable wall members 124 extending between the first major sides and the opposite second major sides of the first portion 134 and the second portion 136, respectively. The deformable wall members 124 of the first portion 134 and the deformable wall members 124 of the second portion 136 may be part of a single, unitary body comprising the gelatinous elastomer, as previously described herein.

The deformable wall members 124 in the generally planar first portion 134 are located and configured such that the voids 126 defined therebetween have a first average size, and the deformable wall members 124 in the generally planar second portion 136 are located and configured such that the voids 126 defined therebetween have a second average size. In some embodiments, the first average size may be smaller than the second average size. In other words, the voids 126 in the first portion 134 may have a smaller cross-sectional area in a plane parallel to the first major surface 120 than the voids 126 in the second portion 136, as shown in FIG. 9. For example, the voids 126 in the first portion 134 may have a cross-sectional area in a plane parallel to the first major surface 120 of between about 0.15 square inch and about 2.0 square inches, and the voids 126 in the second portion 136 may have a cross-sectional area in a plane parallel to the first major surface 120 that is between about two (2) times and about six (6) times the cross-sectional area of the voids 126 in the first portion 134. As one particular non-limiting embodiment, the voids 126 in the first portion 134 may have a cross-sectional area in a plane parallel to the first major surface 120 of 0.20 square inch, and the voids 126 in the second portion 136 may have a cross-sectional area in a plane parallel to the first major surface 120 of 0.8 square inch.

The deformable wall members 124 in the generally planar first portion 134 may have a wall thickness $T_{134}$ (FIG. 5) of between about 0.02 inch and about 0.07 inch and, more particularly, a wall thickness $T_{134}$ of about 0.05 inch. The triangular voids 126 in the first portion 134 may have a height $H_{134}$ (FIG. 5) of between about 0.20 inch and 1.00 inch and, more particularly, a height $H_{134}$ of about 0.60 inch. The deformable wall members 124 of the second portion 136 may have a greater thickness than the deformable wall members 124 of the first portion 134. In some embodiments, the deformable wall members 124 of the second portion 136 may have a thickness $T_{136}$ that is between about two (2) times and about (6) times the thickness $T_{134}$ of the deformable walls 124 in the second portion 136. The thickness $T_{136}$ of the deformable walls 124 in the second portion 136 may be between about 0.04 inch and about 0.20 inch and, more particularly, may be about 0.095 inch. The triangular voids 126 of the second portion 136 may have a greater height $H_{136}$ than the triangular voids 126 of the first portion 134. In some embodiments, the voids 126 of the second portion 136 may have a height $H_{136}$ that is between two (2) times and about six (6) times the height $H_{134}$ of the voids 126 of the first portion 134. The height $H_{134}$ may be between about 0.6 inch and about 1.8 inches and, more particularly, may be about 1.21 inches.

In some embodiments, the first portion 134 may include from two to six times (e.g., four times) as many voids 126 as are present in the second portion 136. Furthermore, the deformable wall members 124 in the first portion 134 may be thinner than the deformable wall members 124 in the second portion 136. By way of example and not limitation, the deformable wall members 124 in the first portion 134 may have a thickness that is between about 25% and about 75% (e.g., about 50%) of the thickness of the deformable wall members 124 in the second portion 136.

The first portion 134 may have a first average thickness (in the direction perpendicular to the first major surface 120), and the second portion 136 may have a second average thickness different from the first average thickness. For example, the first portion 134 may be thinner than the second portion 136 in the direction perpendicular to the first major surface 120, as shown in FIG. 9. Thus, the voids 126 in the first portion 134 may be shorter in the dimension perpendicular to the first major surface 120 than the voids 126 in the second portion 136.

Furthermore, the deformable wall members 124 in the first portion 134 may be configured to buckle when a pressure applied to a cushioning surface of the pillow cushion 102 (i.e., the first major surface 120) in the direction perpendicular to the first major surface 120 exceeds a first threshold pressure level, and the deformable wall members 124 in the second portion 136 are configured to buckle when a pressure applied to the cushioning surface of the pillow cushion 102 in the direction perpendicular to the first major surface 120 exceeds a second threshold pressure level that is different than the first threshold pressure level. In such a configuration, the pillow cushion 102 may exhibit a dual-stage buckling property.

In additional embodiments, more than two layers of buckling columns defined by deformable wall members 124 and voids 126 may be employed, and the threshold buckling pressure level may vary amongst each of the layers so as to cause the pillow cushion 102 to exhibit a multi-stage (e.g., three or more stages) buckling property.

In yet further embodiments, the pillow cushion 102 may comprise a single layer of buckling columns defined by deformable wall members 124 and voids 126 extending continuously between the first major surface 120 and the second major surface 122, such that the pillow cushion 102 exhibits a single-stage buckling property.

As shown in FIG. 7, the deformable wall members 124 in the first portion 134 (FIG. 9) are located and configured to define a first set of triangular voids 126 therebetween. As shown in FIG. 8, the deformable wall members 124 in the second portion 136 (FIG. 9) also may be located and configured to define a second set of triangular voids 126 therebetween. At least some of the first set of triangular voids 126 in the first portion 134 may be misaligned with the second set of triangular voids 126 in the second portion 136 in the direction perpendicular to the first major surface 120 of the pillow cushion 102. In other words, the central axis of at least some of the voids 126 in the first portion 134 may not be colinear with respective central axis of voids 126 in the second portion 136. In some embodiments, however, some of the voids 126 in the first portion 134 may be aligned with voids 126 in the second portion 136.

As shown in FIGS. 7, 8, and 9, the pillow cushion 102 may include a stabilizing layer 140 in some embodiments. The stabilizing layer 140 may comprise an integral portion of the gelatinous elastomer that extends horizontally within the pillow cushion 102 and that is located between the first major surface 120 and the second major surface 122 in a direction generally parallel to at least one of the first major surface 120 and the second major surface 122 of the pillow cushion 102. The stabilizing layer 140 of the gelatinous elastomer may be disposed in peripheral regions 142 (FIGS. 7 and 9) of the pillow cushion 102 and not disposed in a central region of the pillow cushion 102. The pillow cushion 102 may be fabricated using a molding process, and the stabilizing layer 140 may be formed at the mold parting line, which is at the interface between the first portion 134 and the second portion 136. For example, the first and second portions 134, 136 may be formed by molding gelatinous elastomer in a cavity of a mold (e.g., a bi-part mold having two mold halves) to form a single, unitary body of the gelatinous elastomer.

The stabilizing layer 140 may cause the peripheral regions 142 of the pillow cushion 102, which support the neck of a person using the pillow 100, to be relatively firmer or stiffer (and more supportive) than the central region of the pillow cushion 102, which supports the head of the user. This has an orthopedic shaping effect without having to make the un-deformed pillow shaped so as to have a three-dimensional contour under the neck and the head. Furthermore, the stabilizing layer 140 increases the side-load stiffness around the periphery of the pillow cushion 102, which helps the pillow 100 keep, or rebound to, its un-deformed shape after deformation.

In additional embodiments, the stabilizing layer 140 may extend continuously across the entire area of the pillow cushion 102 through the peripheral regions 142 and the central region of the pillow cushion 102.

Apertures 144 may extend through the stabilizing layer 140 of the gelatinous elastomer so as to allow air flow through the stabilizing layer 140 between voids 126 on opposing sides of the stabilizing layer 140, as shown in FIGS. 7 and 8. The apertures 144 enhance breathability of the pillow cushion 102.

In some embodiments, the pillow cushion 102 of the pillow 100 may be free of foam and/or fiber cushioning material.

In some embodiments, a non-cushioning fabric may be fused to the second major surface 122 of the pillow cushion 102, so as to improve the lateral stability of the pillow cushion 102 and ensure that the pillow 100 will keep, or rebound to, its un-deformed shape after deformation. The fabric may comprise a non-stretchable fabric that is heat-fused to the second major surface 122 of the cushion 120. A non-stretchable woven fabric may be employed, though any fabric may be used including non-woven fabric, stretchy fabric, or woven fabric that has little to no stretch.

As previously mentioned, there may be no additional cushioning material between the pillow cushion 102 and the pillow cover 104. The pillow cover 104 may comprise, for example, a stretchable knit material with a small amount (e.g., ⅛" thick) of loft, in a weight of about 400 grams/m$^2$. Such a material is sufficient to dampen the feel on the ear or the face of the user of the deformable wall members 124 of the pillow cushion 102, so that the pillow 100 feels smooth to the face, ear, and/or head of the user. The pillow cover 104 may comprise any fabric, fabric laminate, multi-layer knit fabric, or spacer fabric with sufficient body, weight, and/or loft to substantially eliminate the feeling of, or ability of the user to feel the deformable wall members 124 and voids 126 on the user's face, ear, or head. Furthermore, the pillow cover 104 may comprise a stretchable fabric so as to not interfere with the soft, pressure-redistributing buckling hollow columns of the pillow cushion 102. In some embodiments, only the pillow cover 104 is between the soft gel columnar material of the pillow cushion 102 and the head or face of the user, and no other intermediate material may be present. In some embodiments, however, a thin, stretchy inner cover for the pillow cushion 102 may be present to avoid the gelatinous material of the pillow cushion 102 becoming dirty when removed from the pillow cover 104 for laundering of the pillow cover 104. Such a material, however, may not have a thickness intended to dampen the feel of the buckling hollow columns of the pillow cushion 102.

Figure 10:
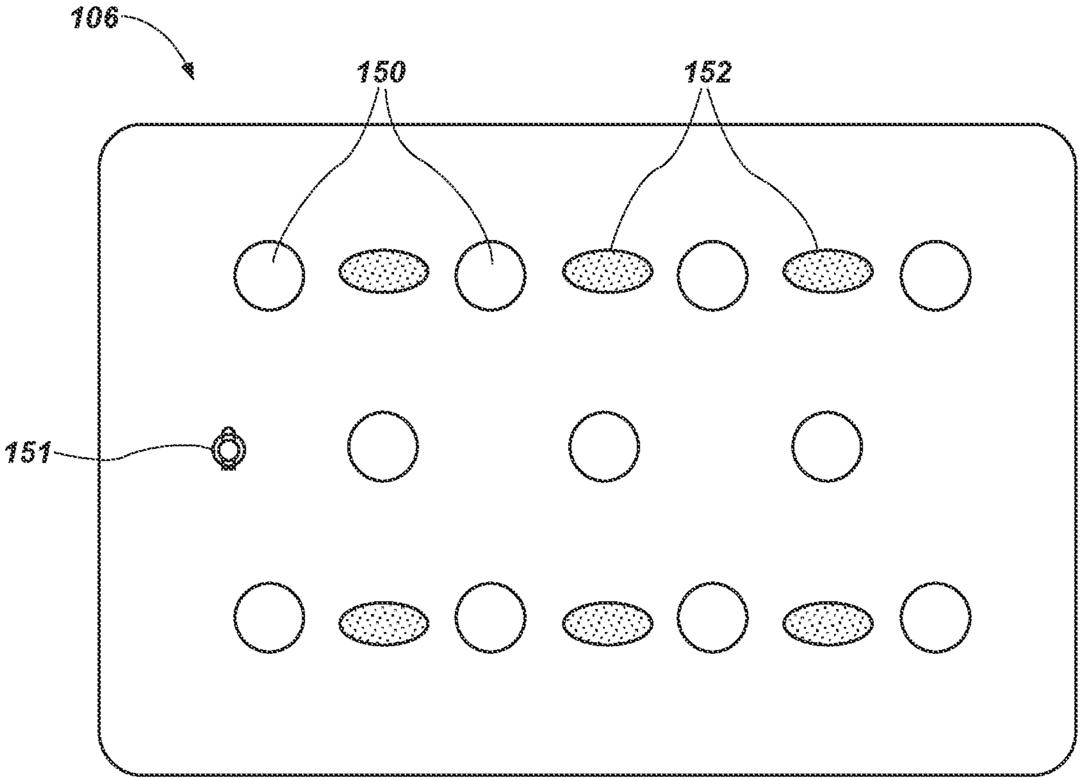
FIG. 10 is a top plan view of an embodiment of an optional insert of the pillow of FIG. 1.

The optional insert 106 is shown in the cross-sectional view of FIG. 2 and the plan view of FIG. 10. As shown therein, the insert 106 may be disposed between the second major surface 122 of the pillow cushion 102 and an inner surface of the pillow cover 104 so as to increase a thickness of the pillow 100. The insert 106 may comprise any material. In the embodiment of FIGS. 2 and 10, the insert 106 comprises an inflatable bladder configured to be inflated and/or deflated with air so as to adjust a thickness of the insert 106, and, hence, the pillow 100.

Since the pillow cushion 102 is molded to a specific height (or thickness), and users may prefer a different height, the optional insert 106 may be used to increase the overall height of the pillow 100. The inflatable air bladder can be adjusted to multiple heights by insertion of more or less air through a mouth-inflatable air valve 151 (FIG. 10). Alternatively, a hand-operable or electric-pump-operable valve may be employed. A simple bladder made by welding (e.g., with radio frequency welding or thermal welding) two layers of plastic together may be used. For example, a top layer of plastic and a bottom layer of plastic may be joined by a side gusset piece of plastic. In some embodiments, the top layer can be slightly larger than the bottom layer, which results in the gusset not being vertical, so as to better conform to the shoulder of a person using the pillow and resting on the user's side. The plastic can be laminated to or coated with a flocking fiber, or with fabric, to quiet noise generated upon deforming the plastic, and to provide friction against the pillow cover 104 or the pillow cushion 102 to secure the insert 106 in place. As one non-limiting example, flocked polyvinylchloride (PVC) film may be employed.

As shown in FIG. 10, the insert 106 may have apertures 150 (see also FIG. 2) extending therethrough between a first side of the insert 106 adjacent the pillow cushion 102 (FIG. 2) and an opposing second side of the insert 106 adjacent the pillow cover 104 (FIG. 2). For example, the plastic of the air bladder may include welded holes in the interior region of the air bladder to allow air flow through the insert 106. The insert 106 may be attachable to the pillow cover 104 and/or to the pillow cushion 102 (e.g., to a fabric heat-fused to the cushion) using, for example, hook-and-loop material 152. In other embodiments, snaps, buttons, or the like may be used to secure the insert 106 to the pillow cover 104 and/or the pillow cushion 102. In other embodiments, the insert 106 may simply be held in place against the pillow cushion 102 by the pillow cover 104 without being otherwise attached to the pillow cushion 102 or pillow cover 104.

The inflatable insert 106 may enhance the cushioning effect of the pillow 100, especially when the air bladder is only partially filled. In such cases, the deformability of the insert 106 may add another degree of freedom of movement to the overall cushioning effect. The insert 106 has no effect on height or on cushioning if empty of air, and may be left in the pillow cover 104 or removed. If the air bladder is full to the point of tightness, the thickness of the pillow 100 is maximized, but the insert 106 contributes little to the cushioning effect of the pillow 100. When the air bladder of the insert 106 is between about one-quarter and three-quarters full of air, the insert 106 may significantly contribute to the cushioning effect of the pillow 100.

Figure 11:
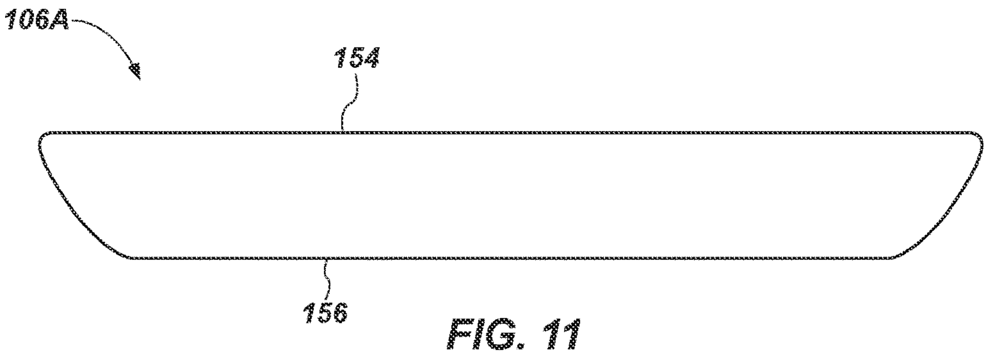
FIG. 11 is a side view of another embodiment of an optional insert of the pillow of FIG. 1.

FIG. 11 illustrates another embodiment of an insert 106A. The insert 106A simply comprises a body of foam. The insert 106A has a length on a side 154 of the insert 106A adjacent the pillow cushion 102 (FIG. 2) greater than a length on a side 156 of the insert 106A adjacent the pillow cover 104 (FIG. 2), and a width on a side 154 of the insert 106A adjacent the pillow cushion 106 greater than a width on a side 156 of the insert 106A adjacent the pillow cover 104.

In additional embodiments, the insert 106A may comprise a plurality of layers of foam, for example, several pieces of 0.75" thick foam, so that the user may put one or more layers of foam under the pillow cushion 102 within the pillow cover 104 so as to configure the pillow 100 with a desired thickness.

In yet further embodiments, bonded polyester fluff fiber, quilted fabric or three-dimensional knitted fabric (often referred to as "spacer fabric") may be employed as or in an optional insert.

A pillow 100 as described herein may be highly breathable due to the hollow buckling columns of the pillow cushion 102, which reduces or eliminates build-up of sweat. The pillow 100 is temperature-neutral, not hot or cool to the touch. Furthermore, the pillow 100 is usable by a person sleeping on his or her side with a full-face CPAP mask, without making a feature of the pillow 100 to avoid contact with the CPAP mask (such as a side cut-out or an indentation as is classically used in pillows meant for use with CPAP masks).

Unlike a traditional pillows that employ particulate cushioning media such as feathers, chopped-foam or shredded-foam, seed-hulls, etc., a pillow 100 as described herein will not lose shape over time during use. Loss of shape is a problem even with non-shredded/chopped pillows, such as memory foam pillows made all in one piece, because, as the body heats up the foam, the stiffness of the foam changes and the foam loses support and shape. A pillow 100 as described herein will retain its same shape and support all night long, and needs no adjustment (e.g., fluffing) during the night or before use on a subsequent night.

Figure 12:
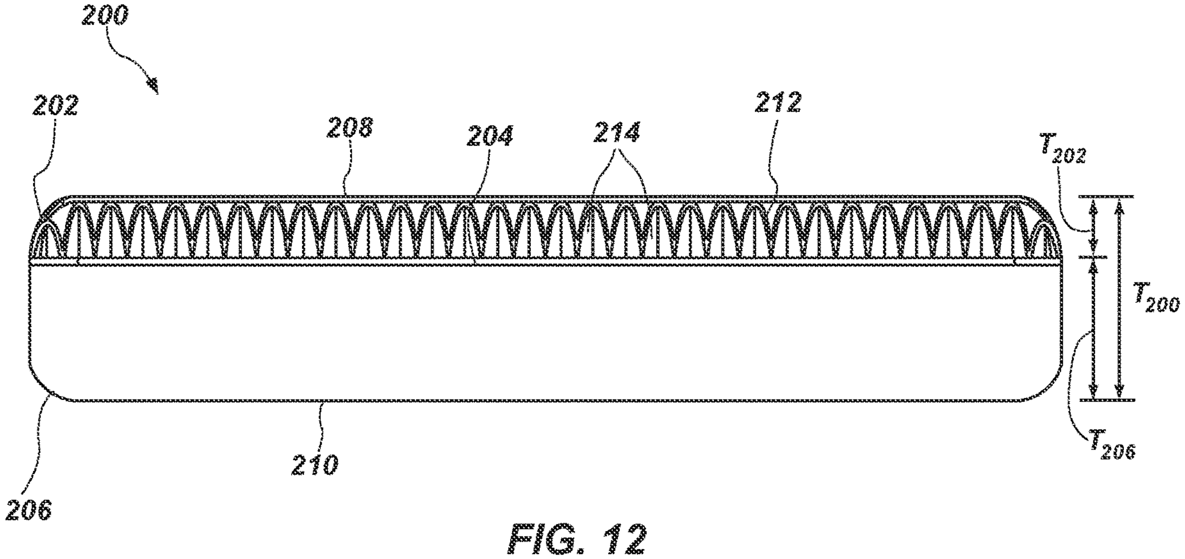
FIG. 12 is a side view of another embodiment of a pillow of the present disclosure.

Pillows according to further embodiments of the present disclosure may also employ particulate cushioning media in combination with gelatinous elastomer cushioning materials. FIG. 12 illustrates a side view of a pillow 200 according to such embodiments. The pillow 200 comprises a first pillow cushion 202 coupled at an interface 204 to a second pillow cushion 206. The first pillow cushion 202 defines an upper first major surface 208 of the pillow 200 and a second pillow cushion 206 defines an opposing lower second major surface 210 of the pillow 200.

The first pillow cushion 202 and the second pillow cushion 206 may have different material compositions. The first pillow cushion 202 may consist essentially of the gelatinous elastomer as previously described herein with regard to the pillow cushion 102. Like the pillow cushion 102, the first pillow cushion 202 includes deformable wall members 212 extending from the interface 204 to the first major surface 208. The deformable wall members 212 are located and configured to define voids 214 therebetween such that the deformable wall members 212 may be displaced into adjacent voids 214 upon deformation of the deformable wall members 212. Furthermore, the deformable wall members 212 are configured to buckle when a pressure applied to a cushioning surface of the first pillow cushion 202 (i.e., the first major surface 208), in a direction perpendicular to the first major surface 208, exceeds a threshold pressure level. The deformable wall members 212 and voids 214 may have a shape, spacing, or other configuration as previously described herein with regard to the first portion 134 of the pillow cushion 102.

The second pillow cushion 206 may comprise a non-gelatinous elastomer material. In some embodiments, the second pillow cushion 206 may comprise a foam body. The foam body may comprise an open cell foam. For example, the open cell foam may comprise polyurethane foam, viscoelastic or memory foam, or latex foam. The open cell foam may be SERENE® foam commercially available from Carpenter Co. of Richmond, VA. The open cell foam may also comprise one or more additives distributed in the open cell structure. For example, the additive may comprise a metallic particulate material including, but not limited to, copper, gold, or silver particles. The additive-containing open cell foam may be CYPRIUM® foam commercially available from FXI, Inc. of Media, PA. The additive may alternatively comprise a polymeric particulate including, but not limited to, gel beds. Foams including such gel additives include, for example, MEMGEL® Plus commercially available from FXI, Inc. of Media, PA. The additive may further comprise magnetic elements. The foam body may comprise a single, unitary body or may comprise multiple foam layers of one or more foam compositions. The foam body of the second pillow cushion 206 may be coupled directly to the first pillow cushion 202. For example, the foam body of the second pillow cushion 206 and the gelatinous elastomer material of the first pillow cushion 202 may be coupled by an adhesive or may be heat-fused together.

According to further embodiments of the present disclosure, the second pillow cushion 206 may comprise a cushioning material disposed in a fabric enclosure. The fabric enclosure may comprise a woven or non-woven fabric. In some embodiments, the fabric may be comprised of stretchable fibers. The stretchable fibers may be selected from, for example, spandex (i.e., "a manufactured fiber in which the fiber-forming substance is a long chain synthetic polymer comprised of at least 85% of a segmented polyurethane" (see 16 C.F.R. § 303.7)), natural or synthetic rubber, olefins, polyesters, polyethers, etc., and combinations thereof. In other embodiments, the fabric may be comprised of non-stretchable fibers. The non-stretchable fibers may be selected from, for example, viscose (e.g., rayon) or cotton. In yet other embodiments, the fabric may be comprised of stretchable and non-stretchable fibers.

The fabric enclosure may comprise a material sufficient to dampen the feel on the ear or face of the user of the pillow 200 of the cushioning materials disposed therein so that the pillow 200 feels smooth to the face, ear, and/or head of the user. The fabric enclosure may comprise any fabric, fabric laminate, multi-layer knit fabric, or spacer fabric with sufficient body, weight, and/or loft to substantially eliminate the feeling of, or ability of the user to feel the cushioning materials disposed therein on the user's face, ear, or head. The fabric enclosure may comprise, for example, a stretchable knit material with a small amount (e.g., ⅛" thick) of loft, in a weight of about 400 grams/$m^2$. The fabric enclosure of the second pillow cushion 206 and the gelatinous elastomer of the first pillow cushion 202 may be coupled together at the interface 204 by an adhesive or may be heat-fused together.

The cushioning material of the second pillow cushion 206 may comprise shredded foam segments in the fabric enclosure. The shredded foam segments may be comprised of any of the foams of the foam body previously described herein. Such foam may be shredded into strips, blocks, spheres, or segments of any other regular or irregular shape. The second pillow cushion 206 may be formed of foam segments of a uniform or variable size distribution.

In other embodiments, the cushioning material of the second pillow cushion 206 may comprise a fibrous material. In such embodiments, the fibrous material may comprise cotton, polyester, polyurethane, wool, or other batting (e.g., wadding) material. The fibrous material may be provided in the fabric enclosure. In some embodiments, the second pillow cushion 206 may comprise the fibrous material and segments of the gelatinous elastomer previously described herein. The gelatinous elastomer segments may have a regular or irregular shape including, but not limited, to strips, blocks, and spheres, and may have a uniform or variable size distribution. The fibrous material and the gelatinous elastomer segments may be intermixed and provided in the fabric enclosure.

In yet further embodiments, the cushioning material of the second pillow cushion 206 may comprise a plurality of micron-sized spheres of a polymeric material often referred to in the art as microbeads. For example, the microbeads may comprise polystyrene or styrofoam. The microbeads may be provided in the fabric enclosure.

The pillow 200, the first pillow cushion 202, and the second pillow cushion 206 are sized and configured to support a head and neck of a person using the pillow 200. The first pillow cushion 202 may have a first maximum thickness $T_{202}$ in a direction perpendicular to the first major surface 208, and the second pillow cushion 206 may have a second maximum thickness $T_{206}$ in a direction perpendicular to the second major surface 210 different from the first average thickness. For example, the first pillow cushion 202 may be thinner than the second pillow cushion 206. For example, the first pillow cushion 202 may have a maximum thickness $T_{202}$ measured from the first major surface 208 to the interface 204 in a range from about 0.5 inch to 2.0 inches, such as a maximum thickness of about 1 inch or about 1.5 inches. The second pillow cushion 206 may have a maximum thickness $T_{206}$ measured from the second major surface 210 to the interface 204 in a range from about 1 inch to about 5 inches, such as a maximum thickness $T_{206}$ of about 2 inches, 2.5 inches, 3 inches, or 3.5 inches. Accordingly, the pillow 200 may have a maximum thickness $T_{200}$ measured between the first major surface 208 and the second major surface 210 of between about 1.5 inches and about 5.5 inches, such as a maximum thickness $T_{200}$ of about 3.0 inches, 3.5 inches, 4 inches, 4.5 inches, and 5 inches.

As illustrated in FIG. 12, the peripheral edges of the pillow 200 may be radiused (e.g., rounded). The radius of the peripheral edges may be from about 0.5 inch to about 5.0 inches, such as about 1.9 inches. In some embodiments, the peripheral edges of the first pillow cushion 202 and the second pillow cushion 204 may have the same or different radius.

The first pillow cushion 202 and the second pillow cushion 204 may be enclosed in the pillow cover 104 as previously described herein. In other embodiments, the pillow cushions 202, 204 may be enclosed in a pillow cover like the pillow cover 104 but lacking a zipper. Accordingly, the pillow cushions 202, 204 may not be removable from the pillow cover without destruction thereof. In use, the pillow 200 with the pillow cover 104 thereon may optionally be inserted into a conventional linen pillowcase.

Embodiments of the disclosure are susceptible to various modifications and alternative forms. Specific embodiments have been shown in the drawings and described in detail herein to provide illustrative examples of embodiments of the disclosure. However, the disclosure is not limited to the particular forms disclosed herein. Rather, embodiments of the disclosure may include all modifications, equivalents, and alternatives falling within the scope of the disclosure as broadly defined herein. Furthermore, elements and features described herein in relation to some embodiments may be implemented in other embodiments of the disclosure, and may be combined with elements and features described herein in relation to other embodiments to provide yet further embodiments of the disclosure.

What is claimed:

1. A pillow, comprising:

a pillow cushion comprising a gelatinous elastomer and including:

first deformable wall members on a first side of the pillow cushion, including first ends defining a first major surface of the pillow cushion, defining first voids in the first side of the pillow cushion, and capable of being displaced into adjacent first voids upon deformation of the first deformable wall members, outer ends of the first voids opening to the first major surface, each first void having a first dimension; and second deformable wall members on a second side of the pillow cushion, including second ends defining a second major surface of the pillow cushion opposite from the first major surface of the pillow cushion, defining second voids in the second side of the pillow cushion, and capable of being displaced into adjacent second voids upon deformation of the second deformable wall members, at least some base ends of the second deformable wall members joined to at least some base ends of the first deformable wall members, base ends of the second voids at least partially communicating with base ends of the first voids, outer ends of the second voids opening to the second major surface, each second void having a second dimension corresponding to the first dimension and being larger than the first dimension.

2. The pillow of claim 1, wherein the first dimension is taken transverse to a length of the first void and the second dimension is taken transverse to a length of the second void.

3. The pillow of claim 2, wherein the first dimension is a maximum distance across a center of the first void and the second dimension is a maximum distance across a center of the second void.

4. The pillow of claim 1, wherein the first void and the second void are at least partially superimposed, the first dimension is a length of the first void, and the second dimension is a length of the second void.

5. The pillow of claim 1, wherein the first deformable wall members buckle when a pressure applied to the first major surface of the pillow cushion in a direction perpendicular to the first major surface exceeds a first threshold pressure level and the second deformable wall members buckle when a pressure applied to the second major surface in a direction perpendicular to the second major surface exceeds a second threshold pressure level different than the first threshold pressure level.

6. The pillow of claim 1, wherein the first voids comprise first triangular voids and the second voids comprise second triangular voids.

7. The pillow of claim 6, wherein at least some of the first triangular voids are misaligned with at least some of the second triangular voids.

8. The pillow of claim 1, wherein the first deformable wall members of a first portion of the pillow cushion have a first height imparting the first portion with a first thickness and the second deformable wall members of a second portion of the pillow cushion have a second height, imparting the second portion with a second thickness different from the first thickness.

9. A pillow, comprising:

a pillow cushion including:

first deformable wall members on a first side of the pillow cushion, including first ends defining a first major surface of the pillow cushion, defining first voids in the first side of the pillow cushion, and capable of being displaced into adjacent first voids upon deformation of the first deformable wall members, outer ends of the first voids opening to the first major surface, each first void having a first dimension taken transverse to a length of the first void; and second deformable wall members on a second side of the pillow cushion, opposite from the first side of the pillow cushion, the second deformable wall members including second ends defining a second major surface of the pillow cushion, defining second voids in the second side of the pillow cushion, and capable of being displaced into adjacent second voids upon deformation of the second deformable wall members, at least portions of base ends of at least some of the second deformable wall members being coextensive with at least portions of at least some of the first deformable wall members, base ends of the second voids at least partially communicating with base ends of the first voids, outer ends of the second voids opening to the second major surface, each second void having a second dimension taken transverse to a length of the second void, corresponding to the first dimension, and being larger than the first dimension.

10. The pillow of claim 9, wherein the first dimension is a maximum distance across a center of the first void and the second dimension is a maximum distance across a center of the second void.

11. The pillow of claim 9, wherein the first deformable wall members buckle when a pressure applied to the first major surface of the pillow cushion in a direction perpendicular to the first major surface exceeds a first threshold pressure level and the second deformable wall members buckle when a pressure applied to the second major surface in a direction perpendicular to the second major surface exceeds a second threshold pressure level different than the first threshold pressure level.

12. The pillow of claim 10, wherein at least some of the first voids are misaligned with at least some of the second voids.

13. A method of fabricating a pillow, comprising:

forming a pillow cushion from a gelatinous elastomer, including:

forming first deformable wall members on a first side of the pillow cushion, including outer ends defining a first major surface of the pillow cushion, and defining first voids in the first side of the pillow cushion, the first voids opening to the first major surface; and forming second deformable wall members in a second side of the pillow cushion, including outer ends defining a second major surface of the pillow cushion, and defining second voids in the second side of the pillow cushion, the second voids opening to the second major surface, wherein forming the first deformable wall members comprises defining each of the first voids to have a first dimension and defining each of the second voids to have a second dimension, the first dimension and the second dimension comprising corresponding dimensions, the second dimension exceeding the first dimension.

14. The method of claim 13, wherein forming the first deformable wall members comprises defining each of the first voids to have a first maximum dimension across the first void and through a center of the first void and defining each of the second voids to have a second maximum dimension across the second void and through a center of the second void, the second maximum dimension exceeding the first maximum dimension.

15. A pillow, comprising:

a pillow cushion comprising a gelatinous elastomer, the pillow cushion sized and configured to support a head and neck of a person using the pillow cushion, the pillow cushion comprising:

a first major surface;

a second major surface; and deformable wall members extending between the first major surface and the second major surface, the deformable wall members defining voids such that the deformable wall members may be displaced into adjacent voids upon deformation of the deformable wall members, at least some of the voids opening to the first major surface and the second major surface, the deformable wall members configured to buckle when a pressure applied to a cushioning surface of the pillow cushion, in a direction perpendicular to the first major surface, exceeds a threshold pressure level, with at least some peripherally located deformable wall members having radiused ends defining radiused peripheral edges of the pillow cushion at a periphery of at least one of the first major surface and the second major surface.

16. The pillow of claim 15, wherein all of the peripherally located wall members have radiused ends, defining radiused peripheral edges of the pillow cushion around a first entirety of a first periphery of the first major surface and around a second entirety of a second periphery of the second major surface.

17. The pillow of claim 15, wherein the pillow cushion further comprises:

a first portion; and a second portion opposite from and continuous with the first portion, wherein each of the first portion and the second portion comprises:

a first major side;

an opposite second major side; and at least a portion of at least some of the deformable wall members extending between the first major side and the opposite second major side;

wherein the deformable wall members in the first portion are located and configured such that the voids defined therebetween have a first average size, and wherein the deformable wall members in the second portion are located and configured such that the voids defined therebetween have a second average size, the first average size being smaller than the second average size.

18. The pillow of claim 17, wherein the deformable wall members in the first portion are configured to buckle when a pressure applied to a cushioning surface of the pillow cushion in the direction perpendicular to the first major surface exceeds a first threshold pressure level, and wherein the deformable wall members in the second portion are configured to buckle when a pressure applied to a cushioning surface of the pillow cushion in the direction perpendicular to the first major surface exceeds a second threshold pressure level different than the first threshold pressure level.

19. A method of fabricating a pillow, comprising:

forming a pillow cushion from a gelatinous elastomer to have a size and configuration that supports a head and neck of a person using the pillow cushion and to include:

a first major surface;

a second major surface; and deformable wall members extending between the first major surface and the second major surface, the deformable wall members defining voids such that the deformable wall members may be displaced into adjacent voids upon deformation of the deformable wall members, at least some of the voids opening to the first major surface and the second major surface, the deformable wall members configured to buckle when a pressure applied to a cushioning surface of the pillow cushion, in a direction perpendicular to the first major surface, exceeds a threshold pressure level, at least some of the deformable wall members located at a periphery of at least one of the first major surface and the second major surface having radiused ends defining radiused peripheral edges of the pillow cushion.

20. The method of claim 19, further comprising:

forming a band integrally with the pillow cushion, the band extending around an outer periphery of the deformable wall members, the radiused ends of the at least some of the deformable wall members being exposed beyond the band.

* * * * *